United States Patent
Hitakatsu et al.

(10) Patent No.: US 12,269,513 B2
(45) Date of Patent: Apr. 8, 2025

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Sho Hitakatsu, Wako (JP); Toshikazu Suwa, Tokyo (JP); Masaki Nakajima, Yokohama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/023,015

(22) PCT Filed: Dec. 28, 2020

(86) PCT No.: PCT/JP2020/049140
§ 371 (c)(1),
(2) Date: Feb. 24, 2023

(87) PCT Pub. No.: WO2022/144974
PCT Pub. Date: Jul. 7, 2022

(65) Prior Publication Data
US 2023/0331260 A1    Oct. 19, 2023

(51) Int. Cl.
*B60W 60/00* (2020.01)

(52) U.S. Cl.
CPC ....... *B60W 60/005* (2020.02); *B60W 2552/10* (2020.02); *B60W 2556/40* (2020.02); *B60W 2710/20* (2013.01); *B60W 2720/106* (2013.01)

(58) Field of Classification Search
CPC .......... B60W 60/005; B60W 60/0011; B60W 40/09; B60W 2420/403; B60W 2420/408;
(Continued)

(56) References Cited

U.S. PATENT DOCUMENTS

2018/0292833 A1    10/2018  You et al.
2020/0278684 A1*    9/2020  Naserian ............. G05D 1/0221

FOREIGN PATENT DOCUMENTS

CN          108688666        10/2018
JP          2005-340975      12/2005
(Continued)

OTHER PUBLICATIONS

Machine translation of JP2017215653A downloaded off Espacenet Sep. 6, 2024 (Year: 2024).*
(Continued)

*Primary Examiner* — Michael V Kerrigan
*Assistant Examiner* — Tanya C Sienko
(74) *Attorney, Agent, or Firm* — Amin, Turocy & Watson, LLP

(57) ABSTRACT

A vehicle control device includes a recognizer configured to recognize a surrounding situation of a vehicle and a driving controller configured to perform automated driving for controlling at least one of acceleration, deceleration, and steering of the vehicle on the basis of the situation recognized by the recognizer and map information including a plurality of coordinate points indicating lanes on a route of the vehicle. The driving controller changes a control level of the automated driving in accordance with the number of coordinate points.

7 Claims, 7 Drawing Sheets

(58) Field of Classification Search
CPC ......... B60W 2556/50; B60W 2710/18; B60W 60/0059; B60W 2552/10; B60W 2556/40; B60W 2710/20; B60W 2720/106; G01C 21/26

See application file for complete search history.

(56) References Cited

FOREIGN PATENT DOCUMENTS

| | | |
|---|---|---|
| JP | 2012-002983 | 1/2012 |
| JP | 2017-007572 | 1/2017 |
| JP | 2017-187723 | 10/2017 |
| JP | 2017-215653 | 12/2017 |
| JP | 2018-189594 | 11/2018 |
| JP | 2019-167116 | 10/2019 |
| WO | 2017/203691 | 11/2017 |
| WO | 2020/045322 | 3/2020 |

OTHER PUBLICATIONS

International Search Report and Written Opinion for International Application No. PCT/JP2020/049140 mailed on Feb. 9, 2021, 9 pages.

Japanese Notice of Allowance for Japanese Patent Application No. 2022-525192 mailed on Jun. 21, 2022.

Chinese Office Action for Chinese Patent Application No. 202080104184.X mailed Dec. 31, 2024.

\* cited by examiner

FIG. 4

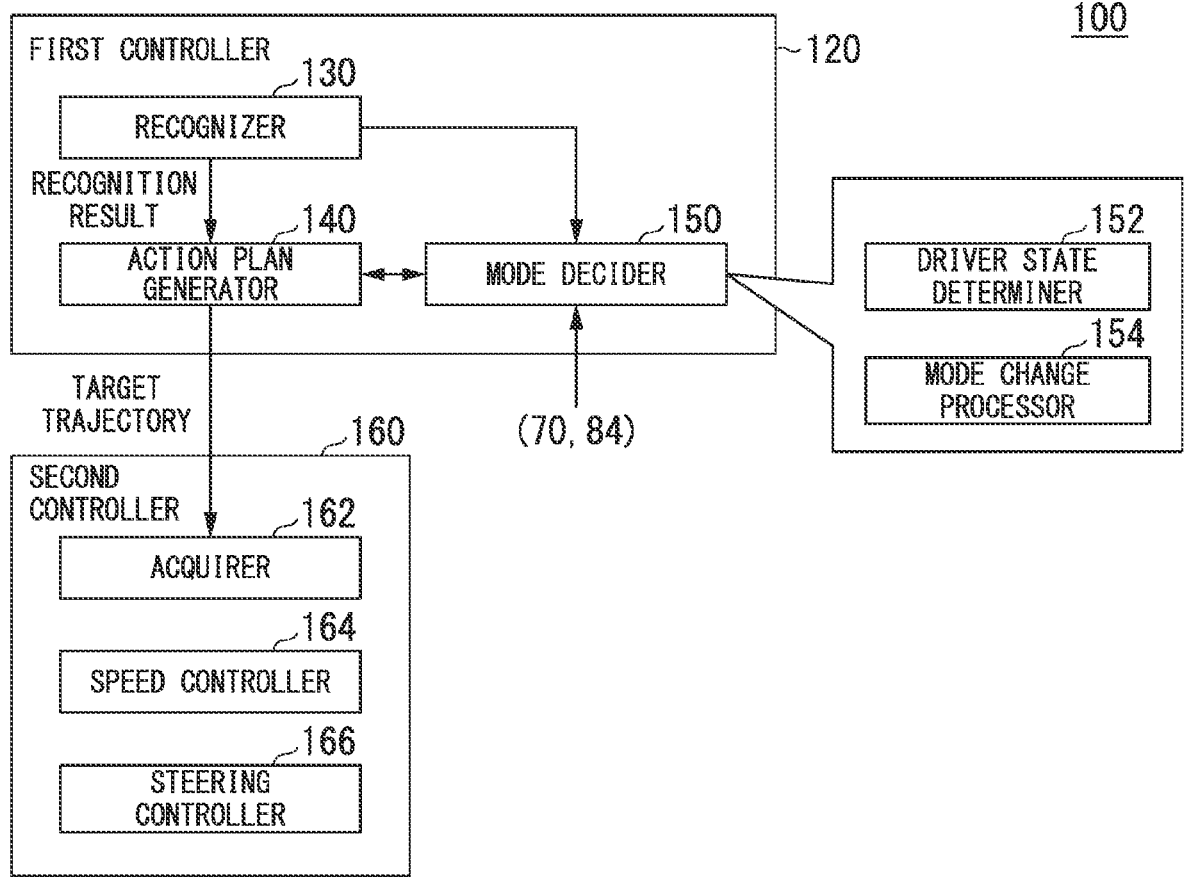

FIG. 5

| DRIVING MODE | CONTROL STATE | TASK |
|---|---|---|
| MODE A | AUTOMATED DRIVING | FORWARD MONITORING:UNNECESSARY STEERING GRIP:UNNECESSARY |
| MODE B | DRIVING ASSISTANCE | FORWARD MONITORING:NECESSARY STEERING GRIP:UNNECESSARY |
| MODE C | DRIVING ASSISTANCE | FORWARD MONITORING:NECESSARY STEERING GRIP:NECESSARY |
| MODE D | DRIVING ASSISTANCE | FORWARD MONITORING:NECESSARY AT LEAST CERTAIN DEGREE OF DRIVING OPERATION IS NECESSARY |
| MODE E | MANUAL DRIVING | FORWARD MONITORING:NECESSARY DRIVING OPERATION IS NECESSARY TOGETHER WITH STEERING AND ACCELERATION/DECELERATION |

TASK:LIGHT ↑
TASK:HEAVY ↓

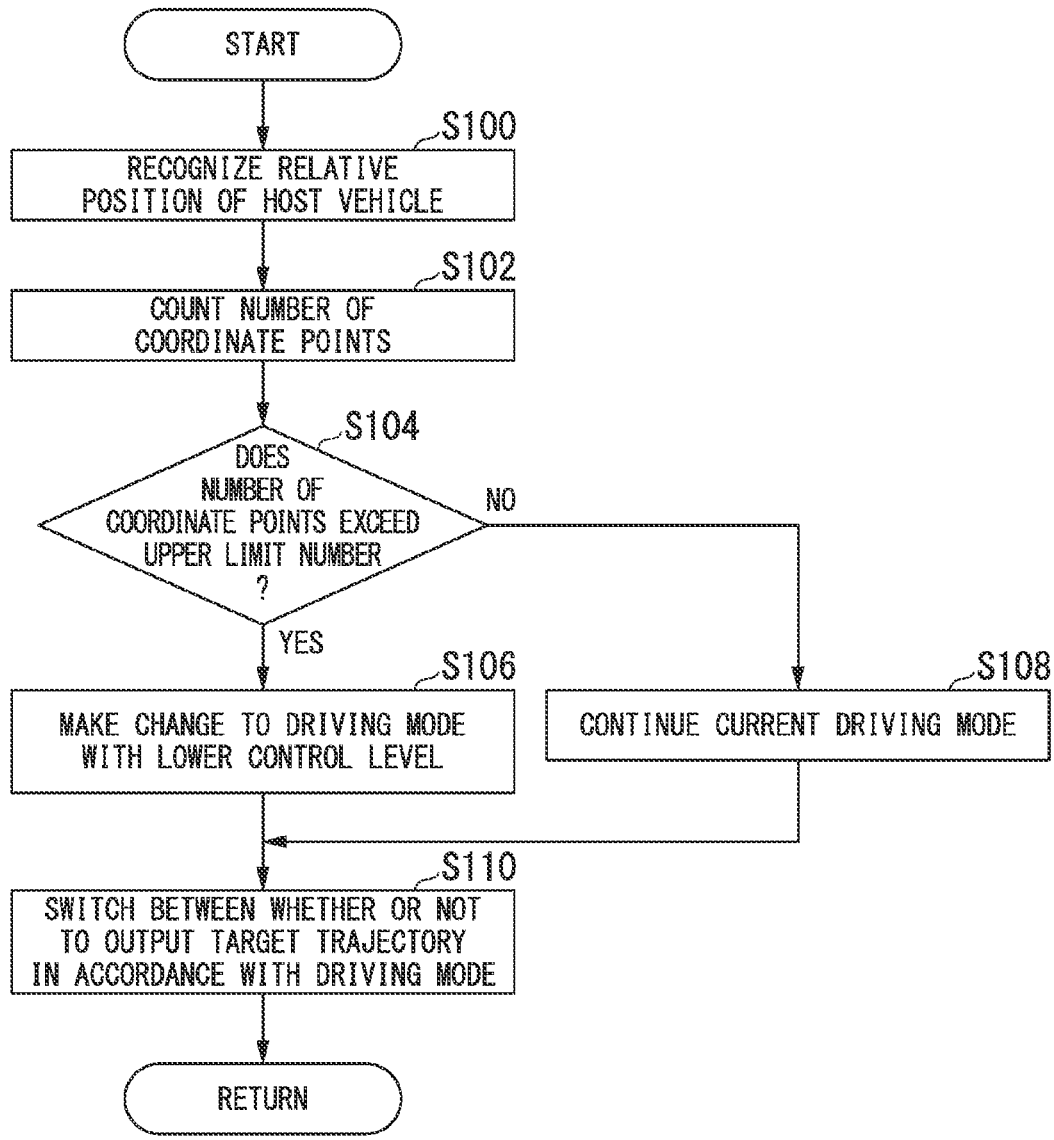

VEHICLE CONTROL DEVICE, VEHICLE CONTROL METHOD, AND STORAGE MEDIUM

TECHNICAL FIELD

The present invention relates to a vehicle control device, a vehicle control method, and a program.

BACKGROUND ART

In the related art, technology for iteratively determining whether or not there is a road through which a host vehicle has passed on a high-precision map and providing a notification of a result of determining whether or not there is a road on the high-precision map is known (see, for example, Patent Document 1).

CITATION LIST

Patent Document

[Patent Document 1]
Japanese Unexamined Patent Application, First Publication No. 2018-189594

SUMMARY OF INVENTION

Technical Problem

In the related art, information stored in a map is used to mechanically provide a notification of the possibility of automated driving. However, in the related art, the processing load increases at points where an amount of information in the map increases, and appropriate automated driving may be difficult.

The present invention has been made in consideration of such circumstances and an objective of the present invention is to provide a vehicle control device, a vehicle control method, and a program capable of performing more appropriate automated driving.

Solution to Problem

A vehicle control device, a vehicle control method, and a program according to the present invention adopt the following configurations.

(1): According to a first aspect of the present invention, there is provided a vehicle control device including: a recognizer configured to recognize a surrounding situation of a vehicle; and a driving controller configured to perform automated driving for controlling at least one of acceleration, deceleration, and steering of the vehicle on the basis of the situation recognized by the recognizer and map information including a plurality of coordinate points indicating lanes on a route of the vehicle, wherein the driving controller changes a control level of the automated driving in accordance with the number of coordinate points.

(2) According to a second aspect of the present invention, in the vehicle control device according to the first aspect, when the number of coordinate points exceeds an upper limit number, the driving controller lowers the control level of the automated driving as compared with a case where the number of coordinate points is less than or equal to the upper limit number.

(3) According to a third aspect of the present invention, in the vehicle control device according to the second aspect, the driving controller thins out the coordinate points when the number of coordinate points exceeds the upper limit number, the driving controller does not lower the control level of the automated driving when the number of coordinate points after a thinning-out process is less than or equal to the upper limit number, and the driving controller lowers the control level of the automated driving when the number of coordinate points after the thinning-out process exceeds the upper limit number.

(4) According to a fourth aspect of the present invention, in the vehicle control device according to any one of the first to third aspects, the driving controller changes the control level of the automated driving in accordance with a sum of the number of coordinate points located in a first range in front of the vehicle as seen from a position of the vehicle on the route and the number of coordinate points located in a second range behind the vehicle as seen from a position of the vehicle on the route, and the first range is wider than the second range.

(5) According to a fifth aspect of the present invention, there is provided a vehicle control method including: recognizing, by a computer mounted in a vehicle, a surrounding situation of the vehicle; performing, by the computer, automated driving for controlling at least one of acceleration, deceleration, and steering of the vehicle on the basis of the recognized situation and map information including a plurality of coordinate points indicating lanes on a route of the vehicle; and changing, by the computer, a control level of the automated driving in accordance with the number of coordinate points.

(6) According to a sixth aspect of the present invention, there is provided a program for causing a computer mounted in a vehicle to: recognize a surrounding situation of the vehicle; perform automated driving for controlling at least one of acceleration, deceleration, and steering of the vehicle on the basis of the recognized situation and map information including a plurality of coordinate points indicating lanes on a route of the vehicle; and change a control level of the automated driving in accordance with the number of coordinate points.

Advantageous Effects of Invention

According to the above-described aspects, it is possible to perform more appropriate automated driving.

BRIEF DESCRIPTION OF DRAWINGS

FIG. 4 is a functional configuration diagram of a first controller and a second controller.

FIG. 5 is a diagram showing an example of corresponding relationships between driving modes, control states of a host vehicle, and tasks.

FIG. 6 is a flowchart showing an example of a flow of a series of processing steps of an automated driving control device according to the first embodiment.

DESCRIPTION OF EMBODIMENTS

Embodiments of a vehicle control device, a vehicle control method, and a program of the present invention will be described below with reference to the drawings.

First Embodiment

[Overall Configuration]

Figure 1:
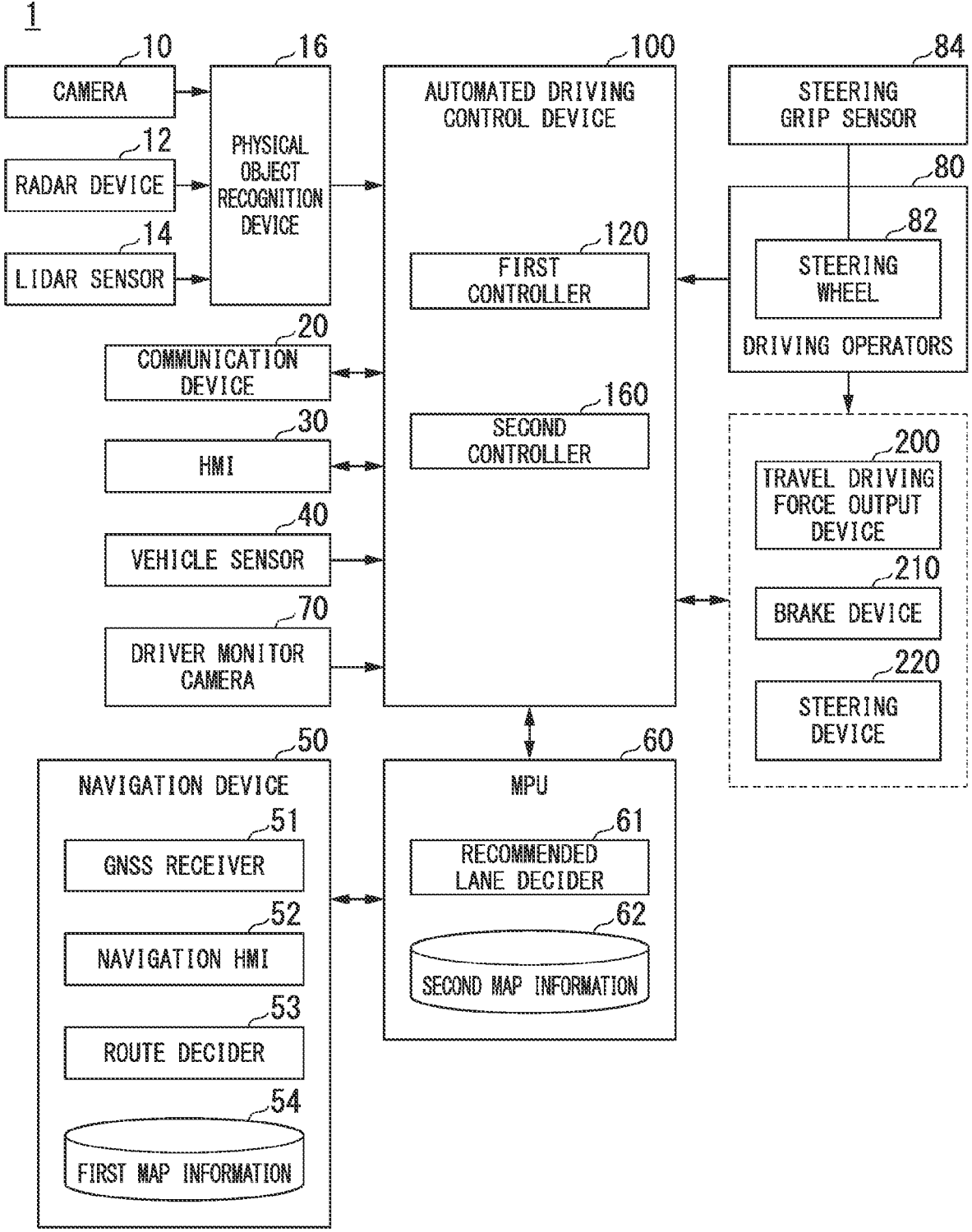
FIG. 1 is a configuration diagram of a vehicle system using a vehicle control device according to a first embodiment.

FIG. 1 is a configuration diagram of a vehicle system 1 using the vehicle control device according to a first embodiment. A vehicle in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates using electric power generated by a power generator connected to the internal combustion engine or electric power that is supplied when a secondary battery or a fuel cell is discharged.

For example, the vehicle system 1 includes a camera 10, a radar device 12, a light detection and ranging (LIDAR) sensor 14, a physical object recognition device 16, a communication device 20, a human machine interface (HMI) 30, a vehicle sensor 40, a navigation device 50, a map positioning unit (MPU) 60, a driver monitor camera 70, driving operators 80, an automated driving control device 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and some of the components may be omitted or other components may be further added. The automated driving control device 100 is an example of a "vehicle control device."

For example, the camera 10 is a digital camera using a solid-state imaging element such as a charge-coupled device (CCD) or a complementary metal-oxide semiconductor (CMOS). The camera 10 is attached to any location on the vehicle (hereinafter referred to as a host vehicle M) in which the vehicle system 1 is mounted. When the view in front of the host vehicle M is imaged, the camera 10 is attached to an upper part of a front windshield, a rear surface of a rearview mirror, or the like. For example, the camera 10 periodically and iteratively images the surroundings of the host vehicle M. The camera 10 may be a stereo camera.

The radar device 12 radiates radio waves such as millimeter waves around the host vehicle M and detects at least a position (a distance to and a direction) of a physical object by detecting radio waves (reflected waves) reflected by the physical object. The radar device 12 is attached to any location on the host vehicle M. The radar device 12 may detect a position and a speed of the physical object in a frequency modulated continuous wave (FM-CW) scheme.

The LIDAR sensor 14 radiates light (or electromagnetic waves having a wavelength close to light) to the vicinity of the host vehicle M and measures scattered light. The LIDAR sensor 14 detects a distance to an object on the basis of time from light emission to light reception. The radiated light is, for example, pulsed laser light. The LIDAR sensor 14 is attached to any location on the host vehicle M.

The physical object recognition device 16 performs a sensor fusion process on detection results from some or all of the camera 10, the radar device 12, and the LIDAR sensor 14 to recognize a position, a type, a speed, and the like of a physical object. The physical object recognition device 16 outputs recognition results to the automated driving control device 100. The physical object recognition device 16 may output detection results of the camera 10, the radar device 12, and the LIDAR sensor 14 to the automated driving control device 100 as they are. The physical object recognition device 16 may be omitted from the vehicle system 1.

The communication device 20 communicates with another vehicle located in the vicinity of the host vehicle M using, for example, a cellular network or a Wi-Fi network, Bluetooth (registered trademark), dedicated short range communication (DSRC), or the like, or communicates with various types of server devices via a radio base station.

The HMI 30 presents various types of information to an occupant of the host vehicle M and receives an input operation from the occupant. The HMI 30 includes various types of display devices, a speaker, a buzzer, a touch panel, a switch, keys, and the like.

The vehicle sensor 40 includes a vehicle speed sensor configured to detect the speed of the host vehicle M, an acceleration sensor configured to detect acceleration, a gyro sensor configured to detect an angular velocity, a direction sensor configured to detect a direction of the host vehicle M, and the like. The gyro sensor may include, for example, a yaw rate sensor configured to detect an angular velocity around the vertical axis.

For example, the navigation device 50 includes a global navigation satellite system (GNSS) receiver 51, a navigation HMI 52, and a route decider 53. The navigation device 50 stores first map information 54 in a storage device such as a hard disk drive (HDD) or a flash memory.

The GNSS receiver 51 receives radio waves from each of a plurality of GNSS satellites (artificial satellites) and identifies a position of the host vehicle M on the basis of received radio wave signals. The GNSS receiver 51 outputs the identified position of the host vehicle M to the route decider 53, directly outputs the identified position of the host vehicle M to the automated driving control device 100, or indirectly outputs the identified position of the host vehicle M to the automated driving control device 100 via the MPU 60. The position of the host vehicle M may be identified or corrected by an inertial navigation system (INS) using an output of the vehicle sensor 40.

The navigation HMI 52 includes a display device, a speaker, a touch panel, keys, and the like. The navigation HMI 52 may be partly or wholly shared with the above-described HMI 30.

For example, the route decider 53 decides on a route (hereinafter referred to as a route on a map) from the position of the host vehicle M identified by the GNSS receiver 51 (or any input position) to a destination input by the occupant using the navigation HMI 52 with reference to the first map information 54.

The first map information 54 is, for example, information in which a road shape is expressed by a link indicating a road and nodes connected by the link. The first map information 54 may include the curvature of a road, point of interest (POI) information, and the like. The route on the map is output to the MPU 60.

The navigation device 50 may perform route guidance using the navigation HMI 52 on the basis of the route on the map. The navigation device 50 may be implemented, for example, according to a function of a terminal device such as a smartphone or a tablet terminal possessed by the occupant. The navigation device 50 may transmit a current position and a destination to a navigation server via the communication device 20 and acquire a route equivalent to the route on the map from the navigation server.

For example, the MPU 60 includes a recommended lane decider 61 and stores second map information 62 in a storage device such as an HDD or a flash memory. The recommended lane decider 61 is implemented, for example, by a hardware processor such as a central processing unit (CPU) executing a program (software). The recommended lane decider 61 may be implemented by hardware (including a circuit; circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be pre-stored in a storage device of the MPU 60 (a storage device including a non-transitory storage medium) or may be stored in a removable storage medium such as a DVD or a CD-ROM and installed in the storage device of the MPU 60 when the storage medium (the non-transitory storage medium) is mounted in a drive device.

The recommended lane decider 61 divides the route on the map provided from the navigation device 50 into a plurality of blocks (for example, divides the route every 100 [m] in a traveling direction of the vehicle), and decides on a recommended lane for each block with reference to the second map information 62. The recommended lane decider 61 decides in what lane numbered from the left the vehicle will travel. The recommended lane decider 61 decides on the recommended lane so that the host vehicle M can travel along a reasonable route for traveling to a branching destination when there is a branch point in the route on the map.

The second map information 62 is map information having higher accuracy than the first map information 54. For example, the second map information 62 includes information about a center of a lane, information about a boundary of a lane, and the like. Information about the center of the lane includes, for example, a dotted line or a dashed line obtained by connecting several lane center coordinate points. Information about a boundary of a lane includes, for example, a dotted line or a dashed line obtained by connecting several lane boundary coordinate points.

Figure 2:
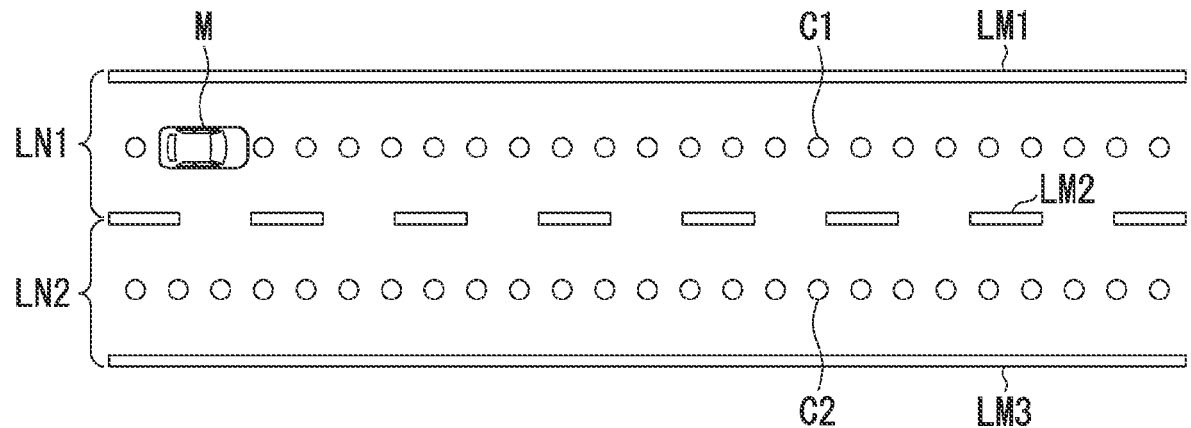
FIG. 2 is a diagram schematically showing an example of second map information.

FIG. 2 is a diagram schematically showing an example of the second map information 62. For example, when a two-lane road is assumed, a first lane LN1, which is one of the two lanes, is defined by markings LM1 and LM2 and the other second lane LN2 is defined by markings LM2 and LM3. In this case, in the second map information 62, a dotted line or a dashed line (C1 in FIG. 2) obtained by connecting coordinate points exactly in the middle between the markings LM1 and LM2 (aligned in the extension direction of the road) is included as information about the center of the first lane LN1. Likewise, in the second map information 62, a dotted line or a dashed line (C2 in FIG. 2) obtained by connecting coordinate points exactly in the middle between the markings LM2 and LM3 (aligned in the extension direction of the road) is included as information about the center of the second lane LN2.

Figure 3:
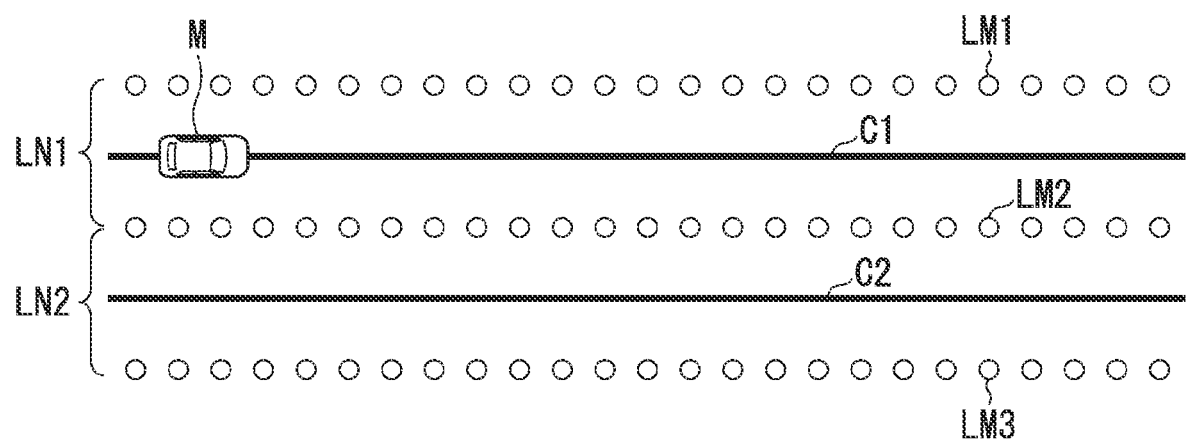
FIG. 3 is a diagram schematically showing another example of the second map information.

FIG. 3 is a diagram schematically showing another example of the second map information 62. As shown in the illustrated example, in the second map information 62, a dotted line or a dashed line obtained by connecting the coordinate points of the marking LM1 (arranged in the extension direction of the road) and a dotted line or a dashed line obtained by connecting the coordinate points of the marking LM2 (arranged in the extension direction of the road) may be included as information about the boundary of the first lane LN1. Likewise, in the second map information 62, the dotted line or the dashed line obtained by connecting the coordinate points of the marking LM2 (arranged in the extension direction of the road) and a dotted line or a dashed line obtained by connecting the coordinate points of the marking LM3 (arranged in the extension direction of the road) may be included as information about the boundary of the second lane LN2.

The interval between the lane center coordinate points and/or the interval between the lane boundary coordinate points are typically uniform. Specifically, the interval between the coordinate points is about 5 [m]. The intervals between the coordinate points are not limited to uniform intervals and may be uneven according to the shape of the road. For example, the interval between coordinate points on a curved road with large curvature may be narrower than that on a straight road.

The second map information 62 may include road information, traffic regulation information, address information (an address/postal code), facility information, telephone number information, information about a prohibition section where mode A or mode B is prohibited to be described below, and the like. The second map information 62 may be updated at any time when the communication device 20 communicates with another device.

The driver monitor camera 70 is, for example, a digital camera that uses a solid-state image sensor such as a CCD or a CMOS. The driver monitor camera 70 is attached to any location on the host vehicle M with respect to a position and a direction where the head of the occupant (hereinafter, the driver) sitting in the driver's seat of the host vehicle M can be imaged from the front (in a direction in which his/her face is imaged). For example, the driver monitor camera 70 is attached to an upper part of a display device provided on the central portion of the instrument panel of the host vehicle M.

For example, the driving operators 80 include an accelerator pedal, a brake pedal, a shift lever, and other operators in addition to a steering wheel 82. A sensor configured to detect an amount of operation or the presence or absence of an operation is attached to the driving operator 80 and a detection result of the sensor is output to the automated driving control device 100 or some or all of the travel driving force output device 200, the brake device 210, and the steering device 220. The steering wheel 82 is an example of an "operator that receives a steering operation by the driver." The steering wheel 82 does not necessarily have to be annular and may be in the form of a variant steering wheel, a joystick, a button, or the like. A steering grip sensor 84 is attached to the steering wheel 82. The steering grip sensor 84 is implemented by a capacitance sensor or the like and outputs a signal for detecting whether or not the driver is gripping the steering wheel 82 (indicating that the driver is in contact with the steering wheel 82 in a state in which a force is applied) to the automated driving control device 100.

The automated driving control device 100 includes, for example, a first controller 120 and a second controller 160. Each of the first controller 120 and the second controller 160 is implemented, for example, by a hardware processor such as a CPU executing a program (software). Some or all of these components may be implemented by hardware (including a circuit; circuitry) such as an LSI circuit, an ASIC, an FPGA, or a GPU or may be implemented by software and hardware in cooperation. The program may be pre-stored in a storage device (a storage device including a non-transitory storage medium) such as an HDD or a flash memory of the automated driving control device 100 or may be stored in a removable storage medium such as a DVD or a CD-ROM and installed in the HDD or the flash memory of the automated driving control device 100 when the storage medium (the non-transitory storage medium) is mounted in a drive device.

FIG. 4 is a functional configuration diagram of the first controller 120 and the second controller 160. The first controller 120 includes, for example, a recognizer 130, an action plan generator 140, and a mode decider 150. An example of a "driving controller" is a combination of the action plan generator 140 and the second controller 160 or a combination of the action plan generator 140, the mode decider 150, and the second controller 160.

For example, the first controller 120 implements a function based on artificial intelligence (AI) and a function based on a previously given model in parallel. For example, an "intersection recognition" function may be implemented by executing intersection recognition based on deep learning or the like and recognition based on previously given conditions (signals, road signs, or the like with which pattern matching is possible) in parallel and performing comprehensive evaluation by assigning scores to both recognition processes. Thereby, the reliability of the automated driving is ensured.

The recognizer 130 recognizes a surrounding situation or an environment of the host vehicle M. For example, the recognizer 130 recognizes physical objects located near the host vehicle M on the basis of information input from the camera 10, the radar device 12, and the LIDAR sensor 14 via the physical object recognition device 16. Physical objects recognized by the recognizer 130 include, for example, bicycles, motorcycles, four-wheeled vehicles, pedestrians, road signs, traffic signs painted on the road, utility poles, guardrails, falling objects, and the like. Also, the recognizer 130 recognizes states of positions, speeds, acceleration, and the like of the physical objects. For example, the position of the physical object is recognized as a position on relative coordinates with a representative point (a center of gravity, a driving shaft center, or the like) of the host vehicle M as the origin (i.e., a relative position to the host vehicle M) and is used for control. The position of the physical object may be represented by a representative point such as a center of gravity or a corner of the physical object or may be represented by a represented area. The "state" of a physical object may include acceleration or jerk of the physical object or an "action state" (for example, whether or not a lane change is being made or intended).

Furthermore, for example, the recognizer 130 recognizes a lane in which the host vehicle M is traveling (hereinafter referred to as a host vehicle lane), an adjacent lane adjacent to the host vehicle lane, and the like. For example, the recognizer 130 acquires the second map information 62 from the MPU 60 and recognizes a space between markings as a host vehicle lane or an adjacent lane by comparing a pattern of road markings (for example, an arrangement of solid lines and dashed lines) included in the acquired second map information 62 with a pattern of road markings in the vicinity of the host vehicle M recognized from an image of the camera 10.

The recognizer 130 may recognize lanes such as a host vehicle lane and an adjacent lane by recognizing a traveling path boundary (a road boundary) including a road marking, a road shoulder, a curb, a median strip, a guardrail, or the like as well as a road marking. In this recognition, a position of the host vehicle M acquired from the navigation device 50 or a processing result of the INS may be added. Also, the recognizer 130 may recognize a temporary stop line, an obstacle, red traffic light, a toll gate, and other road events.

Furthermore, when the host vehicle lane is recognized, the recognizer 130 recognizes a position or an orientation of the host vehicle M with respect to the host vehicle lane. For example, the recognizer 130 may recognize a gap of a reference point of the host vehicle M from the center of the lane and an angle formed with respect to a line connected to a coordinate point of the center of the lane in the traveling direction of the host vehicle M as a relative position and orientation of the host vehicle M related to the host vehicle lane. Alternatively, the recognizer 130 may recognize a position of the reference point of the host vehicle M related to one side end portion (a road marking or a road boundary) of the traveling lane or the like as a relative position of the host vehicle M related to the host vehicle lane.

The action plan generator 140 generates a future target trajectory along which the host vehicle M will automatically travel (independently of the driver's operation) in a state during traveling defined by an event to be described below so that the host vehicle M can generally travel in the recommended lane determined by the recommended lane decider 61 and further cope with a surrounding situation of the host vehicle M.

For example, the target trajectory includes a speed element. For example, the target trajectory is represented by sequentially arranging points (trajectory points) at which the host vehicle M is required to arrive. The trajectory points are points at which the host vehicle M is required to arrive for each prescribed traveling distance (for example, about several meters [m]) along a road. In addition, a target speed and target acceleration for each prescribed sampling time (for example, about several tenths of a second [sec]) are generated as parts of the target trajectory. The trajectory point may be a position at which the host vehicle M is required to arrive at the sampling time for each prescribed sampling time. In this case, information of the target speed or the target acceleration is represented by an interval between the trajectory points.

In order to cope with the surrounding situation of the host vehicle M, the action plan generator 140 may generate a target trajectory along which the host vehicle M travels in another lane exceptionally different from the recommended lane (for example, a lane adjacent to the recommended lane). That is, in principle, the action plan generator 140 may generate a target trajectory along which the host vehicle M exceptionally travels in another lane according to a surrounding situation of the host vehicle M while generating a target trajectory along which the host vehicle M travels in the recommended lane.

When the target trajectory is generated, the action plan generator 140 decides on an event for automated driving (including partial driving assistance) on a route for which the recommended lane has been decided on. The event of automated driving is information that defines the behavior that the host vehicle M should take under automated driving (partial driving assistance), i.e., a state during traveling (or a mode during traveling).

The automated driving events include, for example, a constant-speed driving event, a tracking driving event, a lane change event, a branching-point-related movement event, a merging-point-related movement event, a takeover event, and the like. The constant-speed travel event is a traveling mode for causing the host vehicle M to travel in the same lane at a constant speed. The tracking traveling event is a traveling mode for causing the host vehicle M to track another vehicle (hereinafter referred to as a preceding vehicle) located within a prescribed distance (for example, within 100 [m]) in front of the host vehicle M and closest to the host vehicle M in the host vehicle lane.

"Tracking" may be, for example, a traveling mode for maintaining a uniform inter-vehicle distance (relative distance) between the host vehicle M and the preceding vehicle or a traveling mode for causing the host vehicle M to travel at the center of the host vehicle lane in addition to maintaining the uniform inter-vehicle distance between the host vehicle M and the preceding vehicle.

The lane change event is a traveling mode for causing the host vehicle M to make a lane change from a host vehicle lane to an adjacent lane. The branching-point-related movement event is a traveling mode for causing the host vehicle M to move to a lane in a destination direction at a branching point of a road. The merging-point-related movement event is a traveling mode for causing the host vehicle M to move to a lane of a main road at a merging point. The takeover event is a traveling mode for ending automated driving and performing switching to manual driving.

For example, the events may include a passing event, an avoidance event, and the like. The passing event is a traveling mode for causing the host vehicle M to make a lane change to a previous lane again after the host vehicle M temporarily makes a lane change to an adjacent lane and pass a preceding vehicle. The avoidance event is a traveling mode for causing the host vehicle M to perform at least one of braking and steering so that the contact with an obstacle in front of the host vehicle M is avoided.

In this way, the action plan generator 140 sequentially decides on a plurality of events on the route to the destination and generates a target trajectory for causing the host vehicle M to travel in a state defined by each event in consideration of a surrounding situation of the host vehicle M.

The mode decider 150 decides on a driving mode of the host vehicle M as one of a plurality of driving modes. The plurality of driving modes have different tasks imposed on the driver. The mode decider 150 includes, for example, a driver state determiner 152 and a mode change processor 154. These individual functions will be described below.

FIG. 5 is a diagram showing an example of corresponding relationships between the driving modes, the control states of the host vehicle M, and the tasks. For example, there are five modes from mode A to mode E as the driving modes of the host vehicle M. A control state, i.e., a degree of automation of the driving control of the host vehicle M (a control level), is highest in mode A, lower in the order of mode B, mode C, and mode D, and lowest in mode E. In contrast, a task imposed on the driver is lightest in mode A, heavier in the order of mode B, mode C, and mode D, and heaviest in mode E. Because of a control state that is not automated driving in modes D and E, the automated driving control device 100 is responsible for ending control related to automated driving and shifting the driving mode to driving assistance or manual driving. The content of the driving modes will be exemplified below.

In mode A, in an automated driving state, neither forward monitoring nor gripping of the steering wheel 82 (a steering grip in FIG. 5) is imposed on the driver. However, even in mode A, the driver is required to be in a posture where the fast shift to manual driving is enabled in response to a request from the system centered on the automated driving control device 100.

The term "automated driving" as used herein indicates that both steering and acceleration/deceleration are controlled independently of the operation of the driver. The term "forward region or direction" indicates a space in a traveling direction of the host vehicle M that is visually recognized via the front windshield. Mode A is a driving mode in which the host vehicle M travels at a prescribed speed (for example, about 50 [km/h]) or less on a motorway such as an expressway and which can be executed when a condition in which there is a tracking target preceding vehicle or the like is satisfied. Mode A may be referred to as a traffic jam pilot (TJP). When this condition is no longer satisfied, the mode decider 150 changes the driving mode of the host vehicle M to mode B.

In mode B, in a driving assistance state, a task of monitoring a forward direction of the host vehicle M (hereinafter referred to as forward monitoring) is imposed on the driver, but a task of gripping the steering wheel 82 is not imposed on the driver. In mode C, in a driving assistance state, a forward monitoring task and a task of gripping the steering wheel 82 are imposed on the driver. In mode D, a task in which a certain degree of driving operation is required for at least one of steering and acceleration/deceleration of the host vehicle M is imposed on the driver. For example, in mode D, driving assistance such as adaptive cruise control (ACC) or a lane keeping assist system (LKAS) is performed. In mode E, manual driving in which a task requiring a driving operation for both steering and acceleration/deceleration is imposed on the driver is performed. In both modes D and E, a task of monitoring a forward direction of the host vehicle M is naturally imposed on the driver.

The automated driving control device 100 (and the driving assistance device (not shown)) makes an automated lane change corresponding to the driving mode. Automated lane changes include an automated lane change (1) due to a system request and an automated lane change (2) due to a driver request. Examples of the automated lane change (1) include an automated lane change for passing and an automated lane change for traveling toward a destination (an automated lane change based on a change in a recommended lane) performed when the speed of the preceding vehicle is less than the speed of the host vehicle by a reference level or higher. In the automated lane change (2), if a condition related to a speed, a positional relationship associated with a nearby vehicle, or the like is satisfied, the host vehicle M is allowed to change the lane in an operation direction when a direction indicator has been operated by the driver.

The automated driving control device 100 does not execute either of the automated lane changes (1) and (2) in mode A. The automated driving control device 100 executes both automated lane changes (1) and (2) in modes B and C. The driving assistance device (not shown) does not execute the automated lane change (1) but executes the automated lane change (2) in mode D. In mode E, neither of the automated lane changes (1) and (2) is executed.

The mode decider 150 changes the driving mode of the host vehicle M to a driving mode in which a task is heavier when the task associated with the decided driving mode (hereinafter referred to as a current driving mode) is not executed by the driver.

For example, in mode A, when the driver is in a posture where he/she cannot shift the driving to manual driving in response to a request from the system (for example, when he/she continues to look outside an allowable area or when a sign that driving is difficult is detected), the mode decider 150 performs a control process of prompting the driver to shift the driving to manual driving using the HMI 30, causing the host vehicle M to gradually stop close to the road shoulder when the driver does not respond, and stopping the automated driving. After the automated driving is stopped, the host vehicle M is in a state of mode D or E. Thereby, the host vehicle M can be started according to the manual driving of the driver. Hereinafter, the same is true for "stopping of automated driving." When the driver is not performing forward monitoring in mode B, the mode decider 150 performs a control process of prompting the driver to perform the forward monitoring using the HMI 30, causing the host vehicle M to gradually stop close to the road shoulder when the driver does not respond, and stopping the automated driving. When the driver is not performing forward monitoring or is not gripping the steering wheel 82 in mode C, the mode decider 150 performs a control process of prompting the driver to perform the forward monitoring and/or grip the steering wheel 82 using the HMI 30, causing the host vehicle M to gradually stop close to the road shoulder when the driver does not respond, and stopping the automated driving.

The driver state determiner 152 monitors the driver's state for the above-described mode change and determines whether or not the driver's state corresponds to the task. For example, the driver state determiner 152 performs a posture estimation process by analyzing the image captured by the driver monitor camera 70 and determines whether or not the driver is in a posture in which it is difficult to shift the driving to manual driving in response to a request from the system. The driver state determiner 152 performs a visual line estimation process by analyzing the image captured by the driver monitor camera 70 and determines whether or not the driver is performing forward monitoring.

The mode change processor 154 performs various types of processes for the mode change. For example, the mode change processor 154 instructs the action plan generator 140 to generate a target trajectory for stopping on the road shoulder, instructs a driving assistance device (not shown) to operate, or controls the HMI 30 for instructing the driver to take an action.

The second controller 160 controls the travel driving force output device 200, the brake device 210, and the steering device 220 so that the host vehicle M passes along the target trajectory generated by the action plan generator 140 at the scheduled times.

The second controller 160 includes, for example, an acquirer 162, a speed controller 164, and a steering controller 166. The acquirer 162 acquires information of a target trajectory (trajectory points) generated by the action plan generator 140 and causes a memory (not shown) to store the information. The speed controller 164 controls the travel driving force output device 200 or the brake device 210 on the basis of a speed element associated with the target trajectory stored in the memory. The steering controller 166 controls the steering device 220 in accordance with a degree of curvature of the target trajectory stored in the memory. The processes of the speed controller 164 and the steering controller 166 are implemented by, for example, a combination of feedforward control and feedback control. As an example, the steering controller 166 executes feedforward control according to the curvature of the road in front of the host vehicle M and feedback control based on deviation from the target trajectory in combination.

The travel driving force output device 200 outputs a travel driving force (torque) for enabling the host vehicle M to travel to driving wheels. For example, the travel driving force output device 200 includes a combination of an internal combustion engine, an electric motor, a transmission, and the like, and an electronic control unit (ECU) that controls the internal combustion engine, the electric motor, the transmission, and the like. The ECU controls the above-described components in accordance with information input from the second controller 160 or information input from the driving operator 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second controller 160 or the information input from the driving operator 80 so that brake torque according to a braking operation is output to each wheel. The brake device 210 may include a mechanism configured to transfer the hydraulic pressure generated according to an operation on the brake pedal included in the driving operators 80 to the cylinder via a master cylinder as a backup. The brake device 210 is not limited to the above-described configuration and may be an electronically controlled hydraulic brake device configured to control an actuator in accordance with information input from the second controller 160 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the second controller 160 or the information input from the driving operator 80 to change the direction of the steerable wheels.

[Processing Flow]

A series of processing steps performed by the automated driving control device 100 according to the first embodiment will be described below using a flowchart. FIG. 6 is a flowchart showing an example of a flow of a series of processing steps of the automated driving control device 100 according to the first embodiment. The process of the present flowchart may be iteratively executed at prescribed intervals, for example, when some of the following execution conditions are satisfied.

Condition (i): The automated driving control device 100 is able to acquire the second map information 62 from the MPU 60.

Condition (ii): The host vehicle M is not traveling in a prohibition section of mode A or mode B.

Condition (iii): No abnormality has occurred in the second map information 62.

First, the recognizer 130 recognizes a host vehicle lane or an adjacent lane on the basis of the second map information 62 and an image of the camera 10 with reference to the second map information 62 output from the MPU 60 to the automated driving control device 100 and further recognizes a relative position or an orientation of the host vehicle M related to the recognized host vehicle lane (step S100).

Next, the mode change processor 154 counts the number of coordinate points located near a current position of the host vehicle M in the second map information 62 (a high-precision map) (a relative position recognized by the recognizer 130) with reference to the second map information 62 output from the MPU 60 to the automated driving control device 100 (step S102). Specifically, the mode change processor 154 counts the number of lane center coordinate points Nc and/or the number of lane boundary coordinate points Nb.

Figure 7:
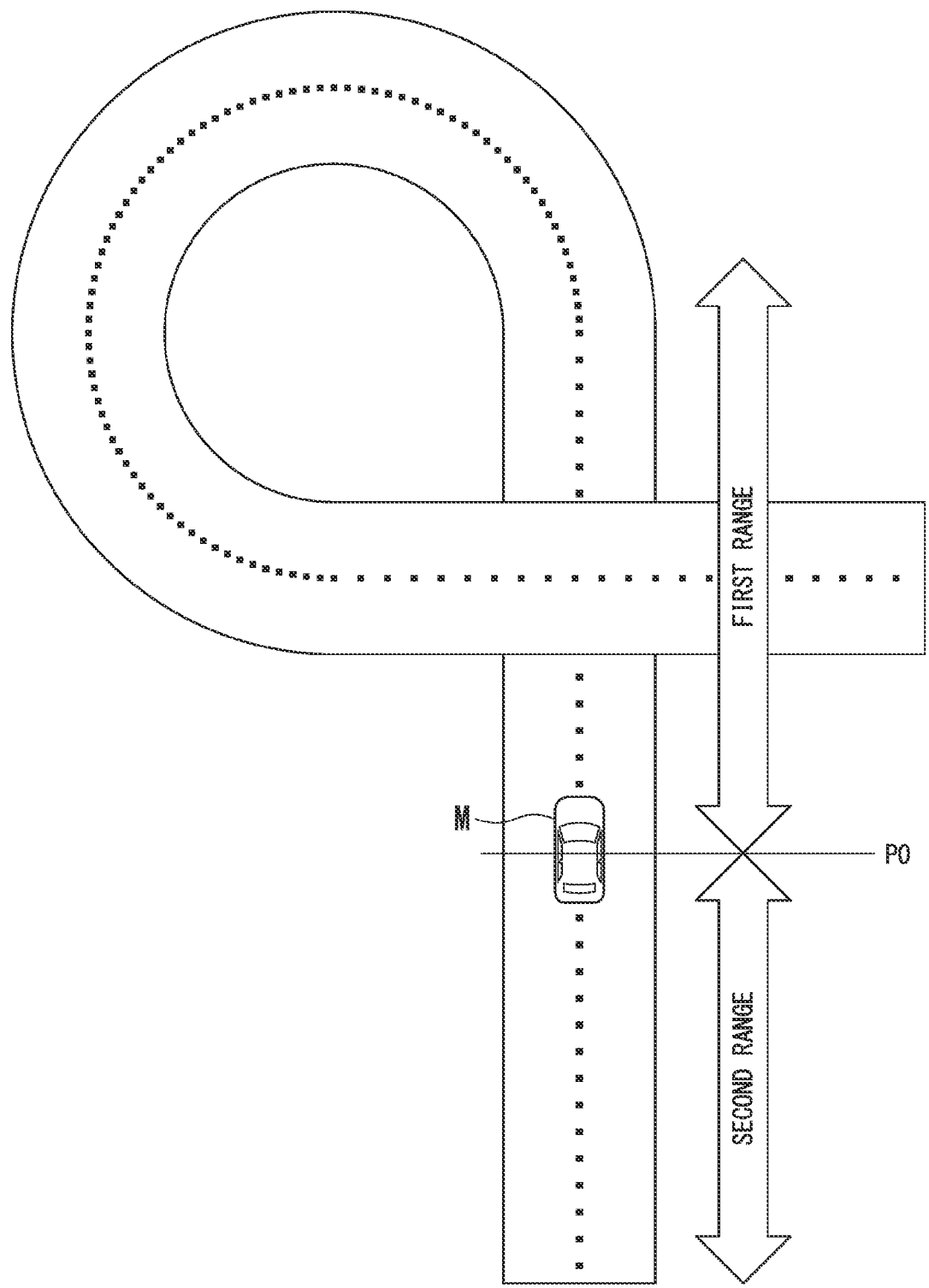
FIG. 7 is a diagram for describing an example of a method of counting the number of coordinate points.

FIG. 7 is a diagram for describing an example of a method of counting the number of coordinate points. In FIG. 7, P0 denotes a current position of the host vehicle M on the route to the destination. For example, the mode change processor 154 counts the number of lane center coordinate points Nc in a first range "in front of" the host vehicle M as seen from the current position P0 of the host vehicle M. Furthermore, the mode change processor 154 counts the number of lane center coordinate points Nc in a second range "behind" the host vehicle M as seen from the current position P0 of the host vehicle M.

The first range and/or the second range may be absolute fixed values or may be relative values that vary with the speed of the host vehicle M or the like. For example, when the first range and the second range are fixed values, the first range may be set to about 300 [m] and the second range may be set to about 200 [m]. That is, the first range may be set as a range wider than the second range.

Instead of or in addition to counting the number of coordinate points within the first range and the second range based on the current position of the host vehicle M, the mode change processor 154 may count the number of coordinate points within a third range in front of the first range.

Figure 8:
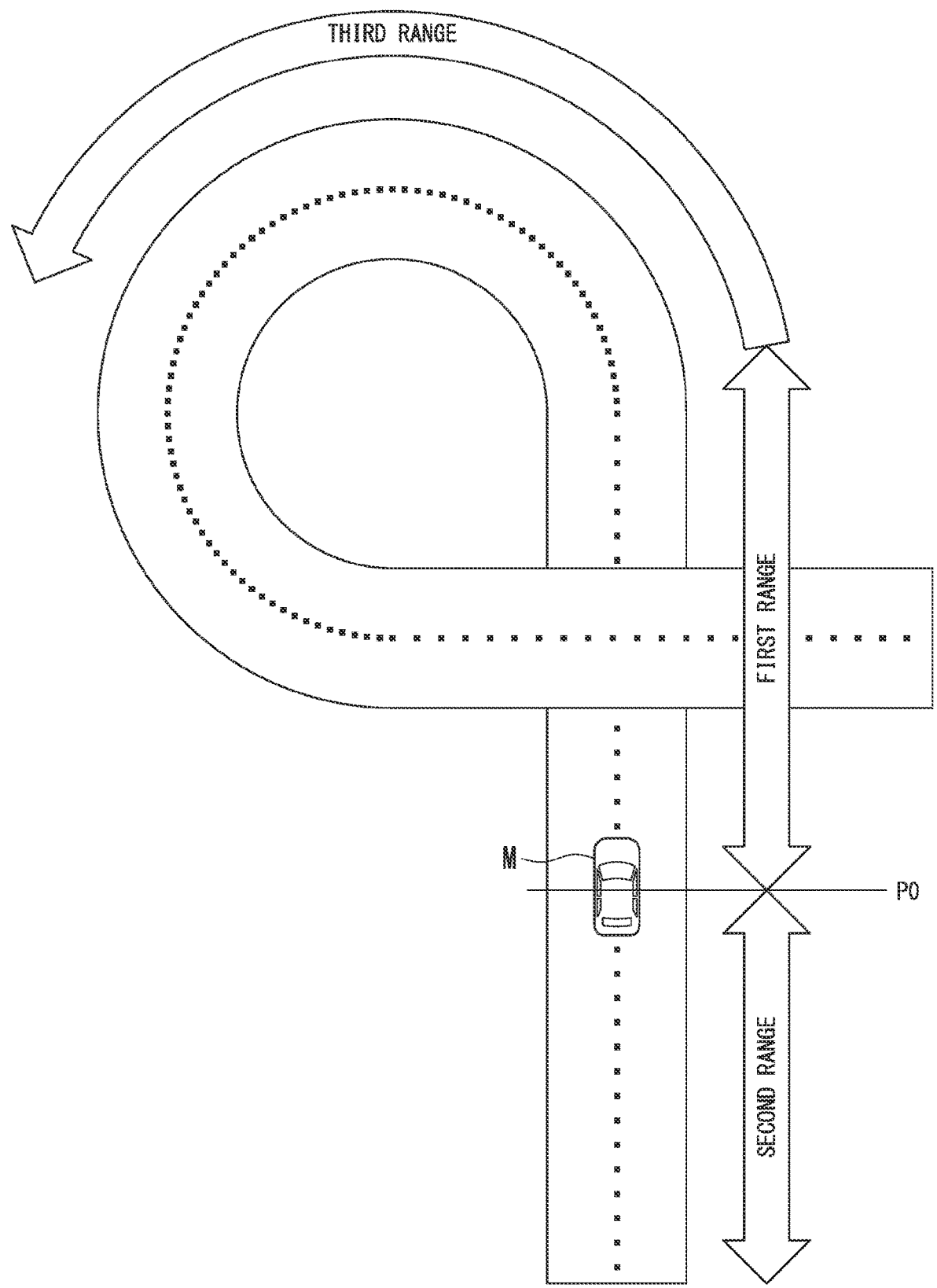
FIG. 8 is a diagram for describing another example of the method of counting the number of coordinate points.

FIG. 8 is a diagram for describing another example of the method of counting the number of coordinate points. For example, the mode change processor 154 counts the number of lane center coordinate points Nc in the third range "in front of" the first range. Like the first range and the second range, the third range may be an absolute fixed value or may be a relative value that varies with the speed of the host vehicle M or the like. The third range may be set to, for example, about 300 [m].

Although a case where the mode change processor 154 counts the number of lane center coordinate points Nc in the first range, the second range, and the third range has been described with reference to FIGS. 7 and 8, the present invention is not limited thereto. For example, the mode change processor 154 may count the number of lane boundary coordinate points Nb in the first range, the second range, and the third range instead of counting the number of lane center coordinate points Nc.

Returning to the description of the flowchart in FIG. 6, subsequently, the mode change processor 154 determines whether or not the counted number of coordinate points exceeds an upper limit number $N_{MAX}$ (step S104).

For example, as shown in FIG. 7, when the number of coordinate points in the first range and the second range has been counted, the mode change processor 154 calculates a sum of the number of coordinate points in the first range and the number of coordinate points in the second range and determines whether or not the calculated sum exceeds the first upper limit number $N_{MAX1}$. The first upper limit number $N_{MAX1}$ may be, for example, about 500.

As described above, in the second map information 62, an interval between the lane center coordinate points and an interval between the lane boundary coordinate points is typically about 5 [m]. Accordingly, assuming that the first range is 300 [m] and the second range is 200 [m], normally, about 100 coordinate points are located within a total travel range of 500 [m], which is the combination of the first range and the second range.

On the other hand, when the number of coordinate points exceeds the first upper limit number $N_{MAX1}$ in the first range and the second range, i.e., when the number of coordinate points is 500, which is five times the normal number, it can be estimated that some abnormality has occurred in the second map information 62 itself or some abnormality has occurred due to the complexity of the road structure and traffic conditions. That is, the mode change processor 154 determines whether or not some abnormality has occurred in the second map information 62 itself or some abnormality has occurred due to the complexity of the road structure and traffic conditions by comparing the number of coordinate points located in the first range and the second range with the first upper limit number $N_{MAX1}$.

Furthermore, as shown in FIG. 8, when the number of coordinate points in the third range has been counted, the mode change processor 154 determines whether or not the number of coordinate points in the third range exceeds the second upper limit number $N_{MAX2}$. The second upper limit number $N_{MAX2}$ may be, for example, about 300.

Assuming that the third range is 300 [m], there are about 60 coordinate points within the travel range of 300 [m] normally.

On the other hand, when the number of coordinate points exceeds the second upper limit number $N_{MAX2}$ in the third range, i.e., when the number of coordinate points is 300 which is five times the normal number, it can be estimated that some abnormality has occurred in the second map information 62 itself or some abnormality has occurred due to the complexity of the road structure and traffic conditions. That is, the mode change processor 154 determines whether or not some abnormality has occurred in the second map information 62 itself or some abnormality has occurred due to the complexity of the road structure and traffic conditions by comparing the number of coordinate points located in the third range with the second upper limit number $N_{MAX2}$.

When the number of coordinate points exceeds the upper limit number $N_{MAX}$, the mode change processor 154 changes the driving mode of the host vehicle M to a driving mode having a lower control level (step S106). That is, when it can be estimated that some abnormality has occurred in the second map information 62 itself or some abnormality has occurred due to the complexity of the road structure and traffic conditions, the mode change processor 154 changes the driving mode of the host vehicle M to a driving mode having a lower control level.

For example, when the driving mode of the host vehicle M is mode A or mode B, the mode change processor 154 changes the driving mode to mode C or mode D having a lower control level than mode B. In other words, the mode change processor 154 changes the mode to mode C or mode D in which the responsibility (task) imposed on the passenger is heavier than that in mode B.

As described above, mode A and mode B are modes in which the occupant is not obligated to grip the steering wheel 82. On the other hand, mode C or mode D is a mode in which the occupant is obligated to grip the steering wheel 82. Accordingly, when the number of coordinate points exceeds the upper limit number $N_{MAX}$ during automated driving or driving assistance, the mode change processor 154 changes the driving mode of the host vehicle M to the mode in which the driver is obligated to grip the steering wheel 82.

In mode E, which is a manual driving mode, the driver is naturally obligated to grip the steering wheel 82. Accordingly, the mode change processor 154 may change the mode from any automated driving or driving assistance mode to mode E when the number of coordinate points exceeds the upper limit number $N_{MAX}$ during automated driving or driving assistance.

On the other hand, when the number of coordinate points is less than or equal to the upper limit number $N_{MAX}$, the mode change processor 154 continues (maintains) the current driving mode without changing the driving mode of the host vehicle M (step S108). That is, the mode change processor 154 continues the current driving mode of the host vehicle M without changing the driving mode of the host vehicle M when it is difficult to estimate that some abnormality has occurred in the second map information 62 itself or some abnormality has occurred due to the complexity of the road structure and traffic conditions.

Subsequently, the action plan generator 140 switches between whether or not to output a target trajectory to the second controller 160 in accordance with the operation mode changed or maintained by the mode change processor 154 (step S110).

For example, when the current operation mode is mode A, B, or C and the number of coordinate points is less than or equal to the upper limit number $N_{MAX}$, the current operation mode is maintained. In this case, the action plan generator 140 outputs the target trajectory to the second controller 160. In response to this, the second controller 160 controls the acceleration, deceleration, or steering of the host vehicle M on the basis of the target trajectory. As a result, automated driving based on the target trajectory is executed under mode A and driving assistance based on the target trajectory is executed under mode B or mode C.

On the other hand, when the current operation mode is mode A or B and the number of coordinate points exceeds the upper limit number $N_{MAX}$, the current operation mode is changed to mode C, D, or E having a lower control level.

For example, when the mode has been changed to mode C, the action plan generator 140 outputs the target trajectory to the second controller 160 like when mode C has been maintained. In response to this, the second controller 160 controls the acceleration, deceleration, and steering of the host vehicle M on the basis of the target trajectory. As a result, under mode C, driving assistance based on the target trajectory is executed.

When the mode has been changed to mode D, the action plan generator 140 outputs the target trajectory to the second controller 160. In this case, the second controller 160 controls one of the travel driving force output device 200, the brake device 210, and the steering device 220 to be controlled on the basis of the target trajectory. That is, the second controller 160 controls one of acceleration, deceleration, and steering of the host vehicle M.

When the mode has been changed to mode E, the action plan generator 140 does not output the target trajectory to the second controller 160. In this case, an ECU of each of the travel driving force output device 200, the brake device 210, and the steering device 220 to be controlled by the second controller 160 controls its own device in accordance with the driver's operation on the driving operator 80. That is, the acceleration, deceleration, and steering of the host vehicle M are controlled in manual driving. Thereby, the process of the present flowchart ends.

According to the first embodiment described above, the recognizer 130 recognizes the lane using the second map information 62 and further recognizes a relative position or orientation of the host vehicle M with respect to the recognized lane. The mode change processor 154 counts the number of coordinate points located near a current position of the host vehicle M (a relative position recognized by the recognizer 130) on the second map information 62. The mode change processor 154 changes the control level of the automated driving in accordance with the counted number of coordinate points. Specifically, when the number of coordinate points exceeds the upper limit number $N_{MAX}$, the mode change processor 154 lowers the control level of automated driving as compared with when the number of coordinate points is less than or equal to the upper limit number $N_{MAX}$.

According to this control, when an amount of map information increases and the processing load increases, it is possible to transfer a part or all of the driving to the driver. For example, when the mode is transferred from mode A or B to mode C, D, or E, the driver of the host vehicle M can perform forward monitoring, grip the steering wheel 82, and cope with a change in the surrounding environment. Thus, the automated driving control device 100 can perform more appropriate automated driving by monitoring the coordinate points of the second map information 62.

Second Embodiment

A second embodiment will be described below. The second embodiment differs from the above-described first embodiment in that, when the number of coordinate points exceeds the upper limit number $N_{MAX}$, some coordinate points are thinned out from among coordinate points exceeding the upper limit number $N_{MAX}$. Hereinafter, differences from the first embodiment will be mainly described and descriptions of content that is the same as the first embodiment will be omitted. Also, in description of the second embodiment, parts that are the same as those of the first embodiment are denoted by the same reference signs.

Figure 9:
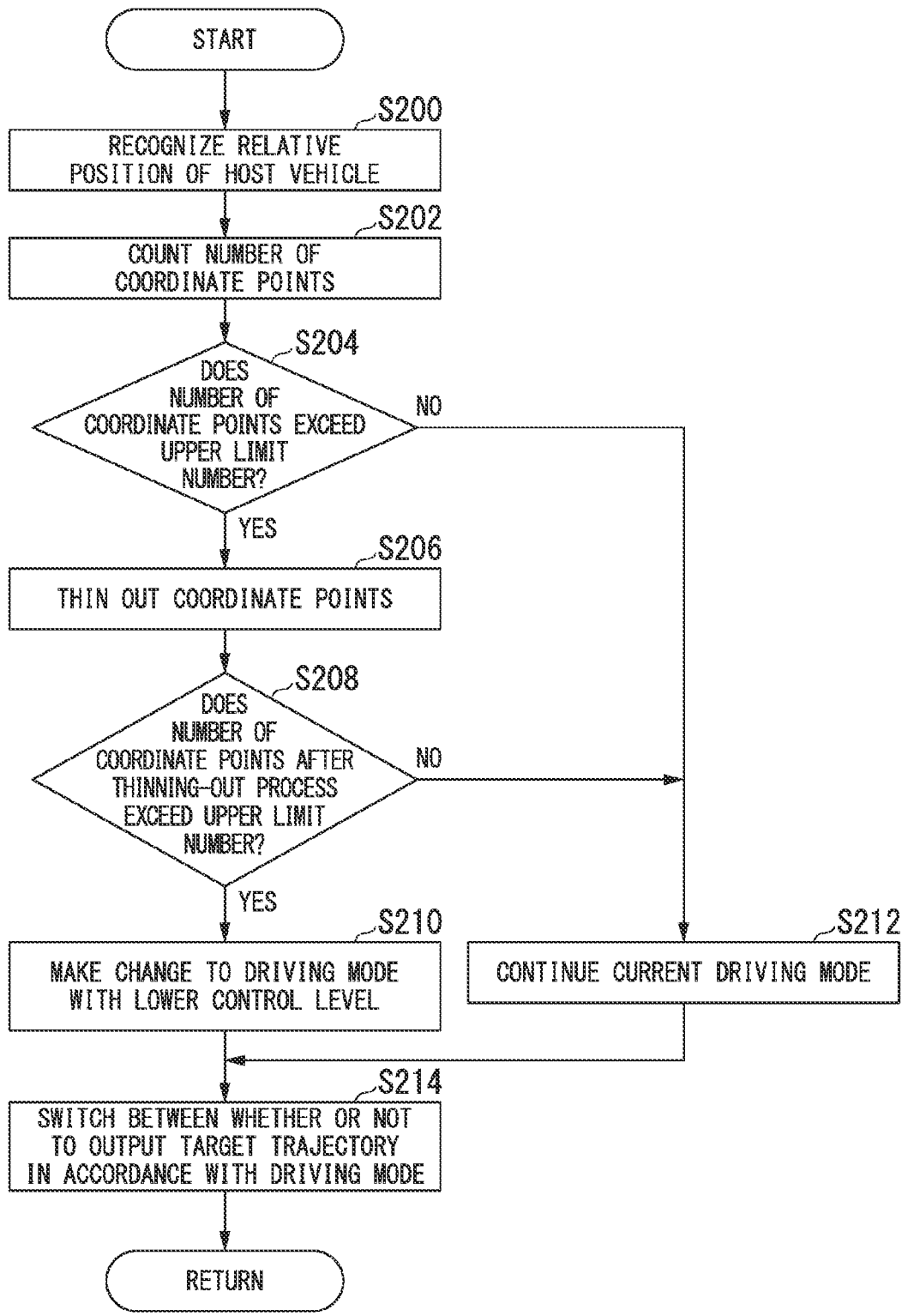
FIG. 9 is a flowchart showing an example of a flow of a series of processing steps of an automated driving control device according to a second embodiment.

FIG. 9 is a flowchart showing an example of a flow of a series of processing steps of the automated driving control device 100 according to the second embodiment. The process of the present flowchart may be iteratively executed at prescribed intervals, for example, when some execution conditions described in the first embodiment are satisfied.

First, the recognizer 130 recognizes a host vehicle lane or an adjacent lane on the basis of the second map information 62 and an image of the camera 10 with reference to the second map information 62 output from the MPU 60 to the automated driving control device 100 and further recognizes a relative position or orientation of the host vehicle M related to the recognized host vehicle lane (step S200).

Subsequently, the mode change processor 154 counts the number of coordinate points located near a current position of the host vehicle M in the second map information 62 (a high-precision map) (a relative position recognized by the recognizer 130) with reference to the second map information 62 output from the MPU 60 to the automated driving control device 100 (step S202).

Subsequently, the mode change processor 154 determines whether or not the counted number of coordinate points exceeds the upper limit number $N_{MAX}$ (step S204).

When the number of coordinate points exceeds the upper limit number $N_{MAX}$, the mode change processor 154 thins out (reduces) coordinate points (step S206).

For example, when the number of coordinate points in the first range and the second range exceeds the first upper limit number $N_{MAX1}$ (for example, 500), the mode change processor 154 thins out coordinate points in the first range and the second range so that an interval between the coordinate points in the first range and the second range is 1 [m] or more.

Likewise, for example, when the number of coordinate points in the third range exceeds the second upper limit number $N_{MAX2}$ (for example, 300), the mode change processor 154 thins out coordinate points in the third range so that an interval between the coordinate points in the third range is 1 [m] or more.

Subsequently, the mode change processor 154 determines whether or not the number of coordinate points after the thinning-out process still exceeds the upper limit number $N_{MAX}$ (step S208).

When the number of coordinate points after the thinning-out process still exceeds the upper limit number $N_{MAX}$, the mode change processor 154 changes the driving mode of the host vehicle M to a driving mode having a lower control level (step S210).

On the other hand, when the number of coordinate points before the thinning-out process is less than or equal to the upper limit number $N_{MAX}$ or when the number of coordinate points after the thinning-out process is less than or equal to the upper limit number $N_{MAX}$, the mode change processor 154 continues (maintains) the current driving mode of the host vehicle M without changing the driving mode of the host vehicle M (step S212).

Subsequently, the action plan generator 140 switches between whether or not to output a target trajectory to the second controller 160 in accordance with the operation mode changed or maintained by the mode change processor 154 (step S214). Thereby, the process of the present flowchart ends.

According to the second embodiment described above, the mode change processor 154 thins out the coordinate points when the number of coordinate points exceeds the upper limit number $N_{MAX}$. The mode change processor 154 does not lower the control level of the automated driving when the number of coordinate points after the thinning-out process is less than or equal to the upper limit number $N_{MAX}$ and lowers the control level of the automated driving when the number of coordinate points after the thinning-out process exceeds the upper limit number $N_{MAX}$.

According to this control, even if the vehicle travels at points where the amount of information of the map increases and the processing load increases, the amount of information can be reduced by thinning out coordinate points from the map. As a result, automated driving can be performed more appropriately than in the first embodiment.

APPENDIXES

The embodiment described above can be represented as follows.

Expression Example 1

A vehicle control device including:
a memory storing a program; and
a hardware processor,
wherein the hardware processor executes the program to:
recognize a surrounding situation of a vehicle;
perform automated driving for controlling at least one of acceleration, deceleration, and steering of the vehicle on the basis of the recognized situation and map information including a plurality of coordinate points indicating lanes on a route of the vehicle; and
change a control level of the automated driving in accordance with the number of coordinate points.

Expression Example 2

A vehicle control device including:
a memory storing a program; and
a hardware processor,
wherein the hardware processor executes the program to:
recognize a surrounding situation of a vehicle;
decide on an event for determining a state of the vehicle during traveling on the basis of the recognized situation, a route to a destination of the vehicle, and a position of the vehicle,
decide on a driving mode of the vehicle as one of a plurality of driving modes including a first driving mode (for example, mode C, D, or E) and a second driving mode (for example, mode A or B) in which a task imposed on a driver is lighter than that in the first driving mode,
perform automated driving for controlling at least one of acceleration, deceleration, and steering of the vehicle on the basis of the decided event,
change the driving mode of the vehicle to a driving mode in which a task is heavier when the task in the decided driving mode is not executed by the driver, and
change the driving mode of the vehicle to a driving mode in which a task is heavier when the number of coordinate points exceeds an upper limit number than when the number of coordinate points is less than or equal to the upper limit number.

Although modes for carrying out the present invention have been described above using embodiments, the present invention is not limited to the embodiments, and various modifications and substitutions can also be made without departing from the scope and spirit of the present invention.

REFERENCE SIGNS LIST

10 Camera
12 Radar device
14 LIDAR sensor
16 Physical object recognition device
20 Communication device
30 HMI
40 Vehicle sensor
50 Navigation device
51 GNSS receiver
52 Navigation HMI
53 Route decider
54 First map information
60 MPU
61 Recommended lane decider
62 Second map information
70 Driver monitor camera
82 Steering wheel
84 Steering grip sensor
100 Automated driving control device
120 First controller
130 Recognizer
140 Action plan generator
150 Mode decider
160 Second controller
162 Acquirer
164 Speed controller
166 Steering controller
200 Travel driving force output device 210 Brake device
220 Steering device

What is claim is:

1. A vehicle control device comprising:
a recognizer configured to recognize a surrounding situation of a vehicle; and
a driving controller configured to perform automated driving for controlling at least one of acceleration, deceleration, and steering of the vehicle on the basis of the situation recognized by the recognizer and map information including a plurality of coordinate points indicating lanes on a route of the vehicle,
wherein the driving controller changes a control level of the automated driving in accordance with the number of coordinate points,
wherein, when the number of coordinate points exceeds an upper limit number, the driving controller lowers the control level of the automated driving as compared with a case where the number of coordinate points is less than or equal to the upper limit number.

2. The vehicle control device according to claim 1,
wherein the driving controller thins out the coordinate points when the number of coordinate points exceeds the upper limit number,
wherein the driving controller does not lower the control level of the automated driving when the number of coordinate points after a thinning-out process is less than or equal to the upper limit number, and
wherein the driving controller lowers the control level of the automated driving when the number of coordinate points after the thinning-out process exceeds the upper limit number.

3. The vehicle control device according to claim 1,
wherein the driving controller changes the control level of the automated driving in accordance with a sum of the number of coordinate points located in a first range in front of the vehicle as seen from a position of the vehicle on the route and the number of coordinate points located in a second range behind the vehicle as seen from a position of the vehicle on the route, and
wherein the first range is wider than the second range.

4. The vehicle control device according to claim 1,
wherein the map information includes information about a center or a boundary of the lane represented by a plurality of the coordinate point connected together in an extension direction of the route.

5. A vehicle control method comprising:
recognizing, by a computer mounted in a vehicle, a surrounding situation of the vehicle;
performing, by the computer, automated driving for controlling at least one of acceleration, deceleration, and steering of the vehicle on the basis of the recognized situation and map information including a plurality of coordinate points indicating lanes on a route of the vehicle;
changing, by the computer, a control level of the automated driving in accordance with the number of coordinate points; and
when the number of coordinate points exceeds an upper limit number, lowering by the computer, the control level of the automated driving as compared with a case where the number of coordinate points is less than or equal to the upper limit.

6. A non-transitory computer-readable storage medium storing a program for causing a computer mounted in a vehicle to execute operations, the operations comprising:
recognizing a surrounding situation of the vehicle;
performing automated driving for controlling at least one of acceleration, deceleration, and steering of the vehicle on the basis of the recognized situation and map information including a plurality of coordinate points indicating lanes on a route of the vehicle;
changing a control level of the automated driving in accordance with the number of coordinate points;
when the number of coordinate points exceeds an upper limit number, lowering the control level of the automated driving as compared with a case whether number of coordinate points is less than or equal to the upper limit number.

7. A vehicle control device comprising:
a recognizer configured to recognize a surrounding situation of a vehicle; and
a driving controller configured to perform automated driving for controlling at least one of acceleration, deceleration, and steering of the vehicle on the basis of the situation recognized by the recognizer and map information including a plurality of coordinate points indicating lanes on a route of the vehicle,
wherein the driving controller changes a control level of the automated driving in accordance with the number of coordinate points,
wherein the driving controller determines a traveling mode of the vehicle to be one of a plurality of traveling modes with different the control level, the plurality of traveling modes including a first traveling mode and a second traveling mode in which a task imposed on a driver of the vehicle is less demanding than in the first traveling mode,
wherein, when the number of coordinate points exceeds an upper limit number under the second traveling mode, the driving controller determines changes the traveling mode of the vehicle to the first traveling mode,
wherein the first traveling mode has a task imposed on the driver to operate the steering of the vehicle, and
wherein the second traveling mode does not have the task imposed on the driver to operate the steering of the vehicle.

* * * * *